March 18, 1924.

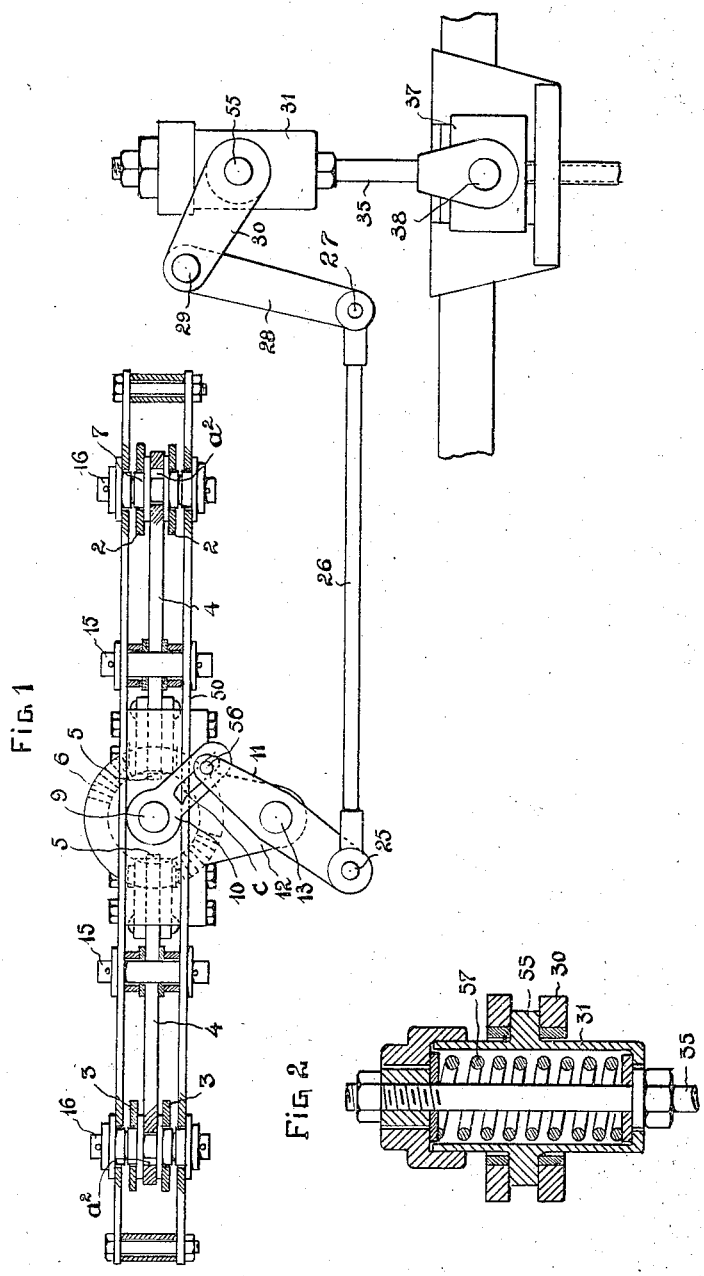

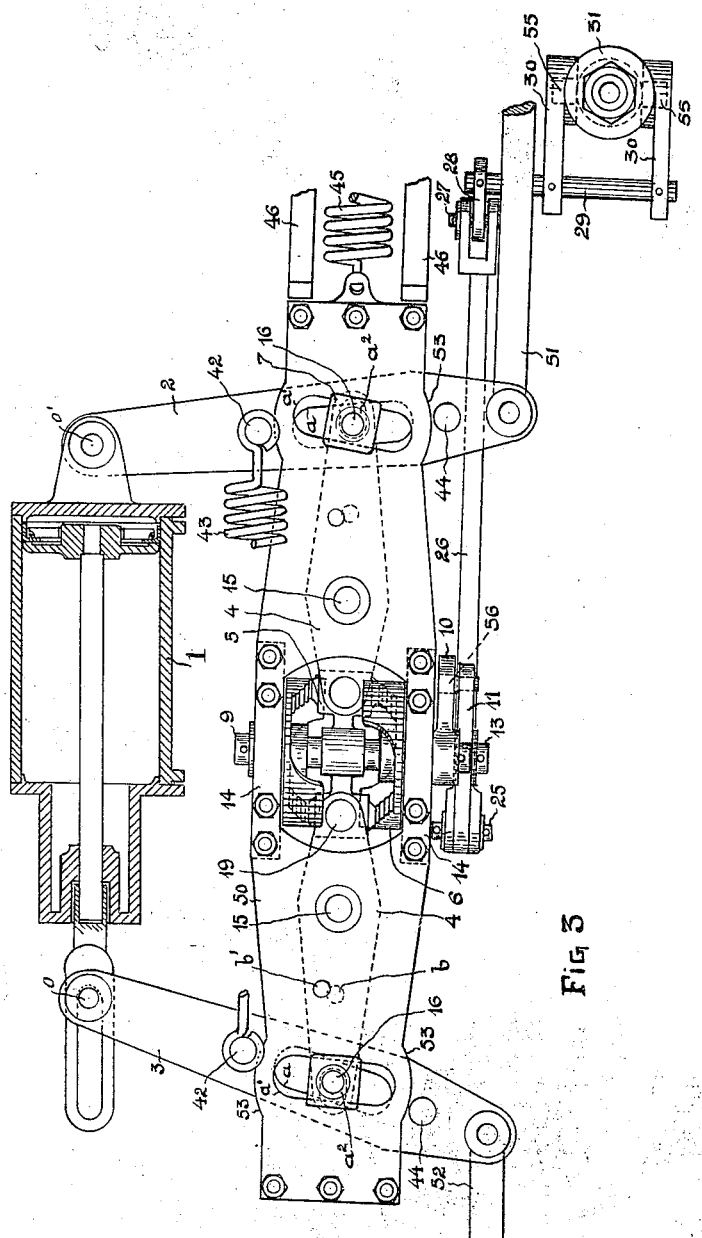

J. L. GAGET-RAGOT
BRAKE DEVICE
Filed Jan. 25, 1922

Inventor
J. L. Gaget-Ragot
by Marks & Clerk
Attys.

Patented Mar. 18, 1924.

1,487,652

UNITED STATES PATENT OFFICE.

JEAN LOUIS GAGET-RAGOT, OF PARIS, FRANCE.

BRAKE DEVICE.

Application filed January 25, 1922. Serial No. 531,743.

*To all whom it may concern:*

Be it known that I, JEAN LOUIS GAGET-RAGOT, a citizen of the Republic of France, residing at 111, Boulevard Exelmans, Paris, France, have invented certain new and useful Improvements in Brake Devices, of which the following is a specification.

The present invention relates to a braking system and device, more particularly adapted for vehicles of all kinds, and especially for railroad vehicles, said devices being arranged in such a way as to produce a braking action varying with the load of said vehicles.

Said system and device have mainly for their object to improve considerably the security and the efficiency of the braking action of vehicles in general and of freight train carriages in particular.

The use of the system and device of the present invention enables the obtention of a maximal output of the apparatus now in use.

In order to obtain this result, the brake shoes (or some of them) are submitted to braking efforts varying with the load. The variation in the effort is produced automatically by a member which is controlled by the changes in the deflection of the suspension springs of the vehicle, said deflection being proportional to the load. Under the action of said changes, the pressure of the brake shoes on the wheels can be maintained constant or can vary according to a given ratio.

Said system and devices can also be arranged in such a way that all reactions, even those resulting from the strongest braking efforts, can in no case react on the suspension springs of the vehicle, and that the connection between the axle bearing and the effort changing member is merely a transmission relay.

Further, the displacement of the member controlled by the variation in load of the vehicle is effected by means of a lever provided with a slot of such shape and outline as to take up the wear of the brake shoes as it is produced.

In the following description it is assumed that the brake used works with compressed air, but it is well understood that the brake could as well be acted upon by a vacuum or by any other motive power; it is also obvious that the invention also applies to brakes using no fluid, such as mechanical, electrical, electro-magnetic brakes or the like.

The annexed drawings show by way of example a braking system according to the invention, worked by compressed air.

Fig. 1 is a side view partly in vertical section, assuming that the vehicle be empty;

Fig. 2 is a vertical section of a buffer;

Fig. 3 is a plan view corresponding to Fig. 1, the air cylinder being in section.

Fig. 4 is a side view of the system, the vehicle being loaded.

Fig. 5 is a partial view at an enlarged scale, of the cam arrangement or braking effort changing member of the device.

1 denotes a brake cylinder by which the motive power is supplied; the piston rod of said cylinder is pivotally connected at 0 to one end of a lever 3. The back end of cylinder 1 bears the fixed pivot 0' of a lever 2. The levers 2 and 3 are united by a connecting rod 50. The pivotal connections of the levers 2 and 3 with the connecting rod 50 are obtained by means of pins 16 and sliding members 7 moving in slots $a$ of levers 2 and 3 and $a^1$ of the connecting rod 50. The slides of the levers 2 and 3 are directed at a certain angle from those formed in the connecting rod 50. Said arrangement has for its object to maintain constant the piston stroke of the brake cylinder, whatever the variation of the lever arms 2 and 3 may be; the connecting rods 51 and 52, fixed respectively on the ends of the levers 2 and 3, serve for transmitting the braking effort to the brake shoes.

According to the cross axis of the connecting rod 50 is lodged a member producing the changes in the braking effort and made up as follows:

Two bearings 14, also used as thrust members, are fixed by means of bolts between the two flanges forming the connecting member 50; a shaft 9 traverses both bearings 14 and on said shaft are fixed two opposed flanges 6 forming a double cam, each of the opposed flanges comprises a series of corresponding steps, between which, and in engagement with, are disposed two movable thrust members 5 fixed to levers 4 by pivots 19. The distance between the corresponding steps of the opposed flanges is just sufficient to permit the location of the thrust members, the two flanges being, however, slightly laterally shifted relative to each other in order to provide a small clearance, such as C (Fig. 5), enabling the thrust members to pass from one step to the next. The arrangement is such that the thrust members will only be displaced by rotation of the cam, to the exclusion of any reciprocal movement, (reaction of the thrust member) upon the cam. Further the levers 4 turn on pivots 15 fixed in connecting rod 50 and are in engagement, at their opposed ends, by means of a longitudinal slide $a^2$, with the short shafts 16 which connect, by means of sliding members 7, the levers 2 and 3 with the connecting rod 50. The levers 4 are pierced with a hole $b$ and the connecting rod 50 with a hole $b^1$. Said holes coincide when the vehicle is empty; when for some reason it is not intended to use the system, two pins can be introduced in said holes and the connecting rod 26, the purpose of which will be described hereafter, can be detached.

The levers 2 and 3 bear abutments 42 and 44 the purpose of which is to maintain the connecting rod 50 in a determined position by means of its cam surfaces 53. A spring 43 fixed by its end to the abutments 42 and a spring 45 secured at one end to the connecting rod 50 and at the other end to a fixed point of the vehicle, act for returning the whole device to the position of rest, in engagement with the abutments 46, after every release of the brake.

On the shaft 9 is mounted a lever 10 having a slot $c$ of predetermined shape or outline, the purpose of which will be more fully explained later on and said slot is connected with an equalizer 11 by means of a crank pin 56. The equalizer 11 is pivoted at 13 on a supporting member 12 fixed by bolts under connecting member 50. The connecting rod 26 is connected by means of a pin 25 to the equalizer 11 and by means of a pin 27 to a lever 28 fixed, together with a fork-shaped lever 30, on a shaft 29, the two levers 28 and 30 being set at a predetermined angle. The other ends of lever 30 are connected by means of pins 55 to a buffer 31 which is connected with the axle bearing 37 of the vehicle by a connecting rod 35 and a pivot 38.

The fixed points of the above described mechanism being attached to the vehicle frame, it is obvious from this arrangement that whenever the load increases, the distance between pins 29 and 38 is reduced, on account of the deflection of the suspension springs under the influence of the increasing load.

Fig. 4 shows the whole device, the brake being released and the vehicle completely loaded. In this position, the reduction of the distance between 29 and 38, resulting from the deflection of the suspension springs under the action of the load, determines the rotation of the lvers 28, 30 on shaft 29. By this movement, the connecting rod 26 turns the equalizer 11 on its pivot 13 and the crank pin 56 carries with it the lever 10. The rotation of the latter is transmitted by shaft 9 to cam 6, the steps of which produce a displacement of the thrust members 5. Said displacement acts for turning the levers 4 on pins 15, and consequently for displacing the pins 16 towards the ends of levers 2 and 3 connected to the rods 51 and 52, and thus increasing the ratio of the lever arms 2 and 3 by displacement of their centres of rotation.

In this movement, the angle between the slots $a^1$ and the slots $a$ acts for bringing nearer together the levers, thus reducing the play of the brake shoes. It must be noted that cam 6 occupies the intermediary position when the vehicle is completely loaded and the brake released; thus, sufficient play is left for the brake shoes in service. Said arrangement enables the use of the device without increasing the piston stroke of the brake cylinder, in order to increase the braking effort.

The second period of increase of the braking effort corresponds to the putting on of the brake. When air under pressure is admitted in cylinder 1, the piston carries with it lever 3, which turns on its pivot 16 and displaces connecting rod 52 to the right, until the brake shoes come into engagement with the wheel. Said brake shoe acting then as fixed point, the piston stroke is continued and produces a translation movement of the connecting rod 50 and of the parts attached to it. Simultaneously, rod 51 is displaced to the left, until the corresponding shoe engages the wheel, and the pivot pin 25 having become fixed, the pivot pin is displaced a predetermined amount, this resulting in a complementary movement of the equalizer 11 on its pivot 13, said movement being transmitted to lever 10 by crank pin 56. The special outline of slot $c$ of lever 10 then intervening, the cam 6 is further rotated. In this movement, steps of different heights engage the thrust members 5, so that the levers 4 are rotated on their pivots 15; the other ends of the levers 4 thus determine the final displacement of pivots 16. The second period of variation of the ratio of lever arms 2, 3 is thus obtained.

During said second period, the important result is obtained of bringing the connecting rods 51 and 52 nearer together, on account of the angular position of the slots $a$ of the levers 2 and 3 with respect to the slots $a^1$ of connecting rod 50; said arrangement enables considerable variations in the braking effort, whilst maintaining the stroke of the brake cylinder piston practically constant.

The release of the brake is obtained as usual, when the action of air under pressure ceases, the levers returning to their original positions, and in this reverse movement the pivot pin 13, effects a tilting of equalizer 11 on its pivot 25; in this movement, lever 10 is brought back to its preceding position and cam 6 is also brought back to its initial point, this returning the system of abutments 5, levers 4 and pivots 16 to the position shown in Figs. 1 and 3 or in Fig. 4.

As previously stated the slot C of lever 10 is of particular shape and comprises essentially a straight radial part and a part inclined to the first one, the inclination being directed in the sense of rotation of cam 6 which correspond to the leading of the vehicle. This arrangement has for its object to provide for an increasing angular displacement of the lever 10, and consequently of cam 6 when the pin 56 is conducted by the said inclined part, that is to say, when the vehicle is completely loaded and the brakes applied. At this moment, in case of wear in the shoes of the brakes, the tilting movement of the lever 11 will be increased, and owing to the resulting more increased rotation of the cam 6, the braking levers 2 and 3 correspondingly move nearer together so that the stroke of the brake cylinder piston is practically maintained constant.

The buffer 31 serves for transmitting the movements created by the deflection of the suspension springs to the connecting rod 26 by means of levers 30 and 28.

Said buffer comprises a spring 57 the initial tension of which is sufficient for overcoming the passive resistances of the system (the brake being completely released). When the train is slowing down, i. e., the brake being lightly applied, the vehicle passes on the rail joints, the axle reacts on the suspension springs and there is a tendency to a displacement of point 27. The cam being entirely irreversible, this movement could not possibly be absorbed. At this moment, spring 57 absorbs the successive reactions.

Two other cases can be considered.

1. When loading a car, the brakes of which are applied, the spring 57, having a sufficient range, will absorb the whole movement; as soon as the brake is released, all parts will return to their initial positions.

2. When unloading a car, the brakes of which are applied, the parts operate in the same manner.

The above described device embodies a system of levers by which the braking effort can be varied, although the motive effort remains constant, by means of the load or, in a more general way, of an auxiliary effort which is independent of the motive effort, acting through the irreversible step cam above described.

The application of the system to the special case of a compressed air brake is given merely by way of example, and it is well understood that the invention comprises not only the application on other brake systems, using any fluid or being controlled mechanically, electrically, magnetically, or otherwise, but also on any effort transmitting system.

The irreversible step cam can differ from the cam above described; the arrangement of the steps given by way of example, their shape and their succession can vary according to the intended purpose. The irreversibility of the cam is due to the fact that the direction of the displacement of the movable member controlled by the cam is at right angles from the plane of the steps of the latter; this eliminates any tangential component enabling the movable member to drive the cam.

Such a cam can be applied to any transmission of movement, and especially to the displacement of the rocking point of a lever.

Having now described my invention, I declare that what I claim is:

1. In a braking device, a cam actuated by the variations of the load, a connecting member on which said cam is mounted, and two brake controlling levers, oscillating in opposite direction, also mounted on the connecting member and between which said cam is mounted.

2. In a braking device, a cam actuated by the variation of the load, a connecting member on which said cam is mounted, brake controlling levers having slots, said connecting member having slots, the first named slots being set at a certain angle to the second named slots, pivotal connections between said levers and said connecting member, the said connections being movable in said slots.

3. In a braking device, a cam actuated by the variation of the load, a connecting member on which said cam is mounted, brake controlling levers having slots, said connecting member having slots, the first named slots being set at a certain angle to the second named slots, pivotal connections movable in said slots and means actuated by the cam for displacing the said pivotal connections.

4. In a braking device, the combination of an actuating device, brake shoes actuated thereby, intermediate levers for transmitting the motive power from the first named device to the brake shoes, said levers being mounted on a connecting member provided with slots, said levers having slots angularly disposed to the first named slots, pivotal connections in the said slots, levers actuated by cam for displacing said pivotal connections, the cam mounted on the connecting member and provided with opposed flanges, each flange of the cam having series of steps, the steps of one flange corresponding to the steps of the other flange and thrust members of the actuating pivotal connection levers comprised between the flanges of the cam.

5. In a braking device, the combination of an actuating device, brake shoes, actuated thereby, intermediate levers for transmitting the motive power from the first named device to the brake shoes, said levers mounted on a connecting member provided with slots, said levers having slots, angularly disposed to the first named slots, pivotal connections in the slots, levers actuated by a cam for displacing said pivotal connections, a cam, a lever mounted on said cam and actuating the latter, a slot in said lever and means connected with the slot for actuating said lever.

6. In a braking device, the combination of an actuating device, brake shoes actuated thereby, intermediate levers for transmitting the motive power from the first named device to the brake shoes, a connecting member provided with slots, said levers having slots angularly disposed to the first named slots, pivotal connections in the slots, a cam, levers actuated by cam for displacing the said pivotal connections, a lever mounted on the cam and actuating the latter, a slot in said lever, said slot comprising a straight part and a part inclined to the first one in the sense of rotation of the cam which corresponds to the direction of movement of the cam incident to the application of the brakes, and means connected with the slot for actuating said lever.

7. In a braking device comprising an actuating device, brake shoes actuated thereby, intermediate levers for transmitting the motive power to the brake shoes, a connecting member provided with slots, said levers having slots, pivotal connections in the slots, a cam and means for displacing the pivotal connections and actuated by the cam, said cam mounted on the connecting member and abutments for securing the position of rest of the said connecting member.

8. In a braking device comprising an actuating device, brake shoes actuated thereby, intermediate levers for transmitting the motive power to the brake shoes, a connecting member between said levers, a cam mounted on the said connecting member, levers actuating the cam, one of said levers oscillating about a fixed point of the vehicle frame and connected by one of its ends to a point of one of the axle bearings.

9. In a braking device comprising an actuating device, brake shoes actuated thereby, intermediate levers for transmitting the motive power to the brake shoes, a connecting member between said levers, a cam mounted on the connecting member, levers actuating the cam, one of the said levers oscillating about a fixed point of the vehicle frame and means, such as an elastic buffer, connecting one of the ends of the last named lever to a fixed point of one of the axle bearings.

In testimony whereof I affix my signature.

JEAN LOUIS GAGET-RAGOT.